United States Patent [19]

White

[11] Patent Number: 4,928,220

[45] Date of Patent: May 22, 1990

[54] SWITCHING MODE DC-TO-DC POWER SUPPLY WITH IMPROVED CURRENT SENSING

[75] Inventor: Alan V. White, Montgomery County, Tex.

[73] Assignee: Compaq Computer Inc., Houston, Tex.

[21] Appl. No.: 258,220

[22] Filed: Oct. 14, 1988

[51] Int. Cl.$^5$ ............... H02H 7/122; H02M 3/335
[52] U.S. Cl. ........................ 363/56; 363/21; 363/95; 361/93; 361/111
[58] Field of Search ............... 363/18–21, 363/49, 55, 56, 95, 131, 16; 323/901, 908; 361/18, 93, 111

[56] References Cited

U.S. PATENT DOCUMENTS 4,330,816  5/1982  Imazeki et al. .................. 363/56
4,355,353 10/1982  Farrer ........................... 363/56 X
4,456,950  6/1984  Cordy, Jr. ...................... 363/56
4,811,184  3/1989  Koninsky et al. ................ 363/56

OTHER PUBLICATIONS

International Rectifier, Data Sheet No. PD-9.515A, for HEXFET Transistors IRFR020 et seq., dated prior to 1988, pp. C-17, C-23, C-24.
Motorola TMOS Power MOSFET Data Book, dated prior to 1988, pp. 1-1-6 to 1-1-11.
James Blanc, "Low–Voltage MOSFETs for Use as Synchronous Rectifiers", Interface, publication of Siliconix, Inc., Winter 1987, pp. 20–21.

Primary Examiner—Patrick R. Salce
Assistant Examiner—Emanuel T. Voeltz

[57] ABSTRACT

A switching rectifier power supply circuit has a power MOS transistor connected in series with half of the primary of a center-tapped transformer, and has rectifiers in series with an inductive load on the secondary side. The gate of the power transistor is driven by a pulse source which is pulse-width modulated in response to the load voltage, and also controlled in response to the current through the power transistor. To prevent leading-edge current spikes due to turn-on of the power transistor from adversely affecting the pulse-width modulator, yet allow trailing-edge current spikes due to transformer saturation to be compensated for, an inhibit circuit is included in the control path responding to current through the power transformer.

18 Claims, 2 Drawing Sheets

SWITCHING MODE DC-TO-DC POWER SUPPLY WITH IMPROVED CURRENT SENSING

BACKGROUND OF THE INVENTION

This invention relates to power supply circuits, and more particularly to a switching mode type of DC-to-DC converter having an improved method of current sensing.

Portable computers of the lap-top size usually have a built-in battery for operating from battery power alone, and also have an AC adapter, often outside the housing, for operating from line current. Two regulated power supplies are used; one is for operating off the battery, and converts +12 V dc to regulated +5 V and +12 V dc, and the other is for operating from 120 V ac line curent or for charging the battery, in which case both of the power supplies are operating if the computer is being used.

When a portable computer is operated on battery power, low power consumption becomes important so that the size and weight of the batteries required to provide the desired running time will be reduced. Also, since it is preferable to omit a fan in the design of battery powered equipment, high efficiency is needed to avoid high temperatures in power supply components. In my copending application Ser. No. 258,213 filled herewith, a highly efficient DC-to-DC converter is described to function as a regulated power supply for operating from the batteries in a portable computer.

For the AC to battery-voltage conversion, a combination of an unregulated power supply circuit to produce a high voltage DC level along with a switching mode rectifier circuit is an appropriate choice; the switching mode circuit provides DC-to-DC conversion with a reasonable degree of output voltage regulation. The regulated DC-to-DC converter such as that of the application Ser. No. 258213 is then used to supply the operating voltages for the computer, just as when only batteries are being used.

A type of controlled rectification device particularly well suited for use in a switching mode type of converter circuit is a power MOS transistor having a short, diffused channel and basically vertical current flow through the substrate; these devices are of reasonable cost, high efficiency (low forward resistance), fast switching, minimum cooling requirements, and offer a high impedance gate input so the drive circuitry can be of low cost logic-type circuitry rather than power-type or current-drive type of circuitry. For constructing this type of power supply circuit at low cost, it has become advantageous to use a commercially available integrated circuit device which performs the function of a pulse-width modulator to drive the gate of one of these MOS power transistors; the pulse width is controlled in response to load voltage, for example.

In controlling the pulses applied to the gate of a power transistor of the type used in these rectification circuits, some kind of filtering is usually employed to prevent or minimize adverse effects of current spikes caused by various transient conditions. By filtering out one category of undesirable voltage or current spike, however, another category may be unintentionally masked; for example, filtering to reduce unwanted effects of turn-on spikes caused by charging various circuit capacitances may have the undesirable result of allowing current spikes caused by transformer saturation to harm the power supply circuit.

It is therefore the principal object of this invention to provide an improved power supply circuit for use in a portable computer or the like. Another object is to provide a high-performance, low-cost, switching-mode type of power supply circuit, particularly one in which the method of current sensing is improved so that current spikes caused by transformer saturation are minimized. A further object is to provide a method of controlling the gates of power FETs in a switching mode type of power supply circuit to prevent undesirable current spikes. An additional object is to provide a power supply circuit for a small portable electronic device, particularly a low-cost circuit which will allow the use of minimum-sized batteries and will generate a minimum of heat so that a cooling fan will not be needed.

SUMMARY OF THE INVENTION

In accordance with one embodiment of the invention, a switching mode power supply circuit has power MOS transistor connected in series with half of the primary of a center-tapped transformer, and has rectifiers in series with an inductive load on the secondary side. The gate of the power transistor is driven by a pulse source which is pulse-width modulated in response to the load voltage on an averaged basis, and also controlled during a cycle in response to the current through the power transistor. To prevent leading-edge current spikes due to turn-on of the power transistor from adversely affecting the pulse-width modulator, yet allow trailing-edge current spikes due to transformer saturation to be compensated for, an inhibit circuit is included in the control path responding to current through the power transformer. In one embodiment, this inhibit circuit uses a PN junction type of field effect transistor to short the current-sense signal at the leading edge of the voltage pulse applied to the gate of the power transistor; the PN junction transistor is turned off after this leading edge so the pulse generator will respond to later spikes of current such as caused by transformer saturation.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

DETAILED DESCRIPTION OF A SPECIFIC EMBODIMENT

Figure 1:
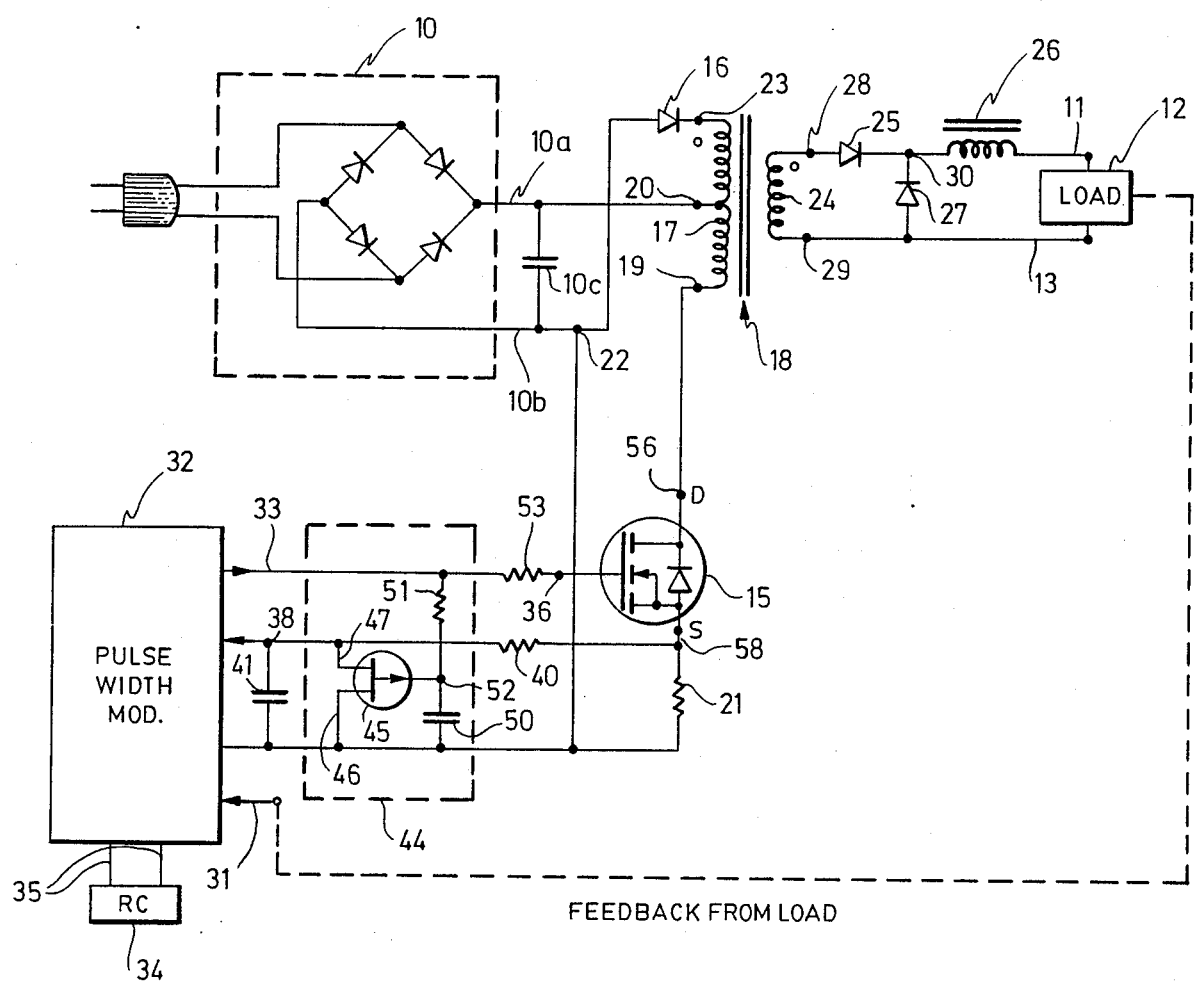
FIG. 1 is an electrical schematic diagram of a switching mode power supply circuit according to one embodiment of the invention.

With reference to FIG. 1, a switching mode type of power supply circuit is shown according to an example of an embodiment of the invention. The input of this circuit is the output 10a and 10b of an unregulated rectifier circuit 10; the circuit 10 receives an input from an AC line plug, and has a large capacitor (e.g., 50-microfd.) at its output. The output of the circuit of FIG. 1 is used to charge a 12 V battery, usually of the nickel-cadmium type, on line 11. This type of power supply would be used as an "AC adapter" for a laptop-type portable computer, for example. A load 12, including the 12 V battery, is connected between this output node 11 and a common or ground line 13, where this load includes another power supply such as the one of my application Ser. No. 258,213, which supplies the +5 V output to supply all of the microprocessor chips, memory chips, logic chips, controllers, and the like for the computer. The object is to produce a regulated voltage on line of perhaps 12 V +/−5% with an unregulated voltage at the output 10a and 10b of rectifier 10 of perhaps 300 V (assuming a voltage doubler type of rectifier 10 is used.

The switching mode circuit of FIG. 1 employs a power MOS field effect transistor 15 and a diode 16 connected to opposite ends of a primary winding 17 for a transformer 18. This type of power MOS transistor is commercially available under the part number IRF830 from International Rectifier Corporation of El Segundo, Calif. The transistor 15 has its source-to-drain path conneced to a node 19 in series with its half of the primary winding 17 of the transformer 18, and the centertap 20 of the primary is connected to the positive output 10a of the rectifier 10. A small resistor 21 (e.g., 1-ohm) is connected in series with the transistor 15 to sense the current through this transistor. The diode or rectifier 16 is connected between a node 22 at the negative terminal 10b of the rectifier 10 and a node 23 at the opposite end of the primary winding 17. The rectifier 16 and the power transistor 15 conduct in alternate half cycles to change the DC voltage to AC, where one half of the primary winding conducts current at any one time. The power transistor 15 has a maximum duty cycle of 50%.

On the secondary side of the transformer 18, a secondary winding 24 is connected in series with a rectifier 25 and an inductor 26, across the load 12. Another rectifier 27 shunts the secondary winding and rectifier 25, poled for conduction in the opposite direction. When the secondary is producing a positive voltage at node 28, the rectifier 25 will conduct in the forward direction and build up current through the inductor 26 and load 12, with a return path via common node 13. The rectifier 27 cannot conduct at this point, as it is in the blocking direction. When the secondary is producing a negative voltage at the the rectifier 25 blocks any current through the secondary winding even though the rectifier 27 would be in the forward direction for such current; however, the rectifier conducts during this period due to collapse of field around the inductor 26 generating a voltage on the node 30 which is negative with respect to the line 11 or load 12. Thus the current through the load is smoothed and the output voltage at node 11 is held at a more-or-less constant level.

The voltage at the output node 11, across the load 12, is detected and fed back by a line 31 to one input of a pulse width modulator 32 which generates pulses of a frequency of about 50 KHz at about 12 V magnitude to drive a node 33 which is coupled to the gate of the switching transistor 15. The pulse width modulator 32 is of standard design and may be a device commercially available under the part number UC3845 from various integrated circuit manufacturers, or may be constructed from standard logic devices. The output of the pulse width modulator 32 on node 33 is of the waveform seen in FIG. 2, where the width of the rectangular pulses will vary according to the feedback voltage on line 31 in such a way as to maintain a constant voltage on the output node 11. That is, as the output voltage at node 11 increases, the pulse width at node 33 decreases so the period of conduction of the power transistor 15 decreases during each "on" period, so this tends to reduce the output voltage at node 11. Conversely, a decrease in the output voltage at node 11 causes the pulse width at node 33 to increase (frequency staying constant) and the duty cycle of conduction of the power transistor 15 increases, tending to raise the output voltage. Because of the filtering effect of the inductor 26 and capacitive load 13, this regulation is averaged over many cycles, rather than being able to control the output on a cycle-by-cycle basis. The frequency of oscillation of the pulse width modulator is controlled by an RC circuit 34 connected to a pair of terminals 35.

Figure 2:
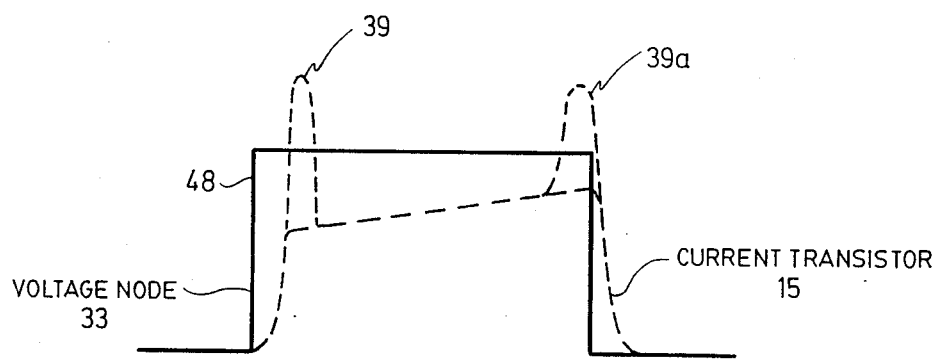
FIG. 2 is a timing diagram of voltage waveforms appearing in the circuit of FIG. 1.

Control of the pulse width of the output 33 on a cycle-by-cycle basis is provided by feedback to an input 38 of the pulse width modulator. The current through the transistor 15 is sensed by the resistor 21 and fed back to this input 38 of the pulse width modulator 32. The charging of circuit capacitances during turn-on of the switching transistor 15 results in a leading edge current spike 39 through the transistor 15, as seen in FIG. 2. This current spike 39 will interfere with normal operation of the pulse width modulator 32 if not filtered out, since it signals excessive current at the beginning of the current pulse and would cause overcompensation or oscillation in the control loop. So, filtering is provided in prior typical circuits of this type by a resistor 4 of about 1-Kohm and a capacitor 41 of about 470-pf; the resultant input to sense node 38 has the spike 39 essentially removed.

The filtering of the current spike 39 by the RC circuit 40,41, may make the pulse width modulator 32 respond too slowly to trailing-edge current spikes 39a caused by saturation of the transformer 18, however. This would allow excessive and damaging currents to occur. Since for some operating modes (such as load transients) transformer saturation is difficult or uneconomic to avoid, requiring more iron in the core or additional hardware and circuitry, it is preferable to sense these current spikes reliably.

Another operating characteristic of this circuit is that under no-load conditions the voltage fed back to the node 38 would tend to be a very narow spike, in the nature of that caused by the spike 39, and this would tend to create jitter as the spike would produce another pulse of current by the transistor 15, producing another spike into node 38, etc. Thus, the added filter arrangement of the invention provides another advantage in improving the operating characteristic.

According to the illustrated embodiment of the invention, it is preferable to have a reliable mechanism for inhibiting the leading-edge current spike 39, without interfering with response to the trailing-edge transformer saturation current spikes 39a. To this end, according to the illustrated embodiment of the invention, an inhibit circuit 44 having a junction field-effect transistor 45 is employed. The P-channel junction field-effect transistor 45 conducts when its gate voltage is near zero relative to its source 46 and drain 47. Thus, at the beginning of a cycle, when the output 33 of the pulse width modulator 32 is at zero, before the leading edge 48 of the voltage pulse of FIG. 2, the transistor 45 is conductive and the capacitor 41 is shorted to ground node 49 to prevent the sensed spike 39 from reaching the input 38. Then, when the output 33 goes high (to about +10 V) at the leading edge 48, to turn on the power transistor 15, a capacitor 50 in the inhibit circuit 44 is charged through a resistor 51 so that a node 52 at the gate of the transistor 45 goes to a positive voltage (above the pinch-off voltage of the transistor 45) and cuts off this transistor 45, allowing the node 38 to respond to current sensing provided by the resistor 21. Compared to prior filtering, in this case, the capacitor 41 is smaller, perhaps 270-pf. The RC filter defined in the inhibit circuit 44 may use a resistor 51 of 1-Kohm and a capacitor 50 of 270-pf in an example. A small resistor 53, e.g., 47-ohm, allows the node 33 to be at a different voltage than the gate 36.

Figure 3:
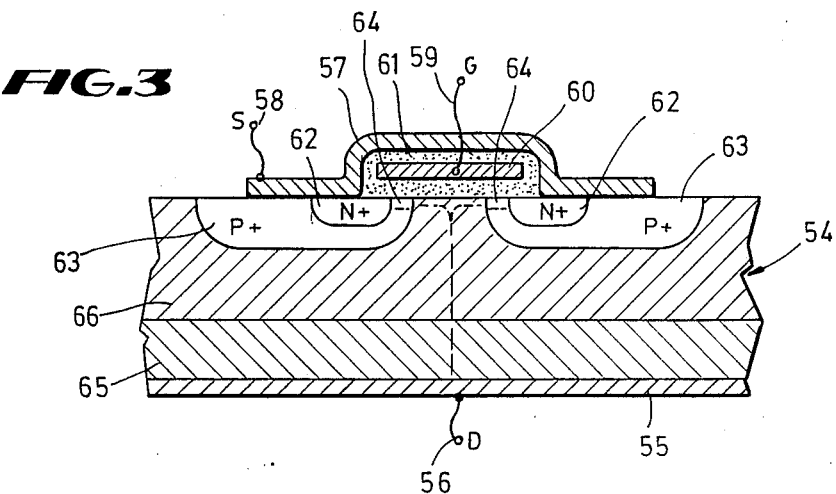
FIG. 3 is an elevation view in section of the MOS power transistor used in the circuit of FIGS. 1.
Figure 4:
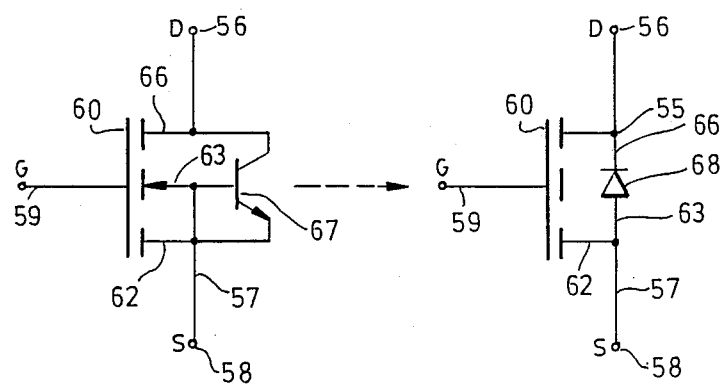
FIG. 4 is an electrical diagram of equivalent circuits for the power transistor device of FIG. 3.

Referring to FIG. 3, the power field-effect transistor 15 used in the circuit of FIG. 1 is shown in a sectional view, greatly enlaged, of course. This device is an N-channel silicon-gate MOS type of transistor constructed on a silicon substrate 54 having a metal contact 55 on the backside functioning as the drain connection 56 and having broad-area metallization 57 on the top functioning as the source connection 58. The gate connection 59 is made to a polysilicon gate layer 60 insulated from the top face of the substrate 64 and from the source metallization 57 by silicon oxide 61. An N+ source region 62 surrounds the gate 60 at the face of the substrate, and a P region 63 surrounds and encloses the source region 62. The channel of the N-channel MOS transistor is created by a shallow surface-adjacent region 64 in this P+ region 63 beneath the gate 60. Current flow (electron flow) for the main source-to-drain path is vertical from the drain contact 55 up to the central area beneath the gate 60 through an N+ contact region 65 and an N-substrate region 66, then laterally through the channel region 64 to the N+ source region 62 and thus to the source contact 57. The source contact shorts across the N+ and P+ regions 62 and 63, so these regions will be at the same potential. The reason for making sure these regions are shorted is to prevent reverse conduction through a parasitic NPN transistor device 67 created by the regions 62, 63 and 66, as seen in FIG. 4. The base and emitter of this transistor 67 are shorted so there can be no base-emitter current to inject minority carriers into the base, thus there can be no collector current; the parasitic transistor can be ignored, so the device appears as an N-channel MOS transistor with a parallel PN junction diode 68 created by the P+ region 63 and the N-type region 56 as depicted in the right-hand side of FIG. 4. This diode 68 is connected in the reverse direction, compared to the source-to-drain path carrying the bulk of the current in the primary winding 17 of FIG. 1. The gates and sources will be elongated, interdigitated physical structures in the actual device, in plan view; that is, the channels 64 will be very short, perhaps two or three microns, created by diffusion of P-type impurity from the N+ source regions, but will be very wide, perhaps measured in mils. The current-carrying capacity is therefore quite large, perhaps 15A.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A control circuit, comprising:
   a controlled device having a current path and a control terminal;
   a pulse generator for applying variable pulses to said control terminal;
   sensing means coupled to said current path of the controlled device and producing an electrical indication of operation of said controlled device; said indication being applied to an input of said pulse generarator to vary said pulses;
   a spike-inhibiting circuit having an input coupled to receive said pulses being applied to said control terminal and having an output coupled to said input of the pulse generator to inhibit said electrical indication from being applied to said input of the pulse generator at the beginning of each of said pulses, said output of said spike-inhibiting circuit including a control transistor having a current path shunting said input of said pulse generator.

2. A circuit according to claim 1 wherein said controlled device is an N-channel MOS power transistor.

3. A circuit according to claim 1 wherein said pulse generator produces repetitive voltage pulses of variable width.

4. A circuit according to claim 3 wherein said pulses are varied in width in response to the result of current through said controlled device.

5. A circuit according to claim 1 wherein said electrical indication is a voltage related to current through said current path.

6. A control circuit, comprising:
   a controlled device having a current path and a control terminal;
   a pulse generator for applying variable pulses to said control terminal;
   sensing means coupled to said current path of the controlled device and producing an electrical indication of operation of said controlled device; said indication being applied to an input of said pulse generator to vary said pulses, said electrical indication being a voltage related to current through said current path;
   an inhibiting circuit coupled to said control terminal to be responsive to said pulses and having an output coupled to said input of the pulse generator to partially inhibit said electrical indication, said inhibit circuit including a control transistor having a current path shunting said input of the pulse generator.

7. A circuit according to claim 6 wherein said inhibit circuit includes an RC filter having an input responsive to said control terminal and an output coupled to a gate of said transistor, and wherein said control transistor is a P-channel junction-type field effect transistor.

8. A method of controlling the gate voltage of a power transistor in a switching mode power supply of the type including a power transistor having a current path in series with a primary winding of a transformer, comprising the steps of:
   (a) generating repetitive voltage pulses having a pulse width related to operation of said power supply;
   (b) applying said voltage pulses to the gate of said power transistor;
   (c) detecting conduction of current through said power transistor and generating a sense voltage to be fed back to an input of a pulse generator which performs said step of generating to thereby alter said voltage pulses in response to said conduction;

(d) and inhibiting leading-edge spikes of said sense voltage for each of said voltage pulses without inhibiting spikes in said sense voltage during the remainder each of said voltage pulses, said step of inhibiting including shunting said input of said pulse generator with a current path of a control transistor.

9. A method according to claim 8 wherein the step of detecting the conduction of current includes generating a sense voltage related to current through the power transistor.

10. A method according to claim 9 wherein said sense voltage is used in said step of generating voltage pulses.

11. A method according to claim 10 wherein said step of inhibiting includes altering said sense voltage at a leading edge of each of said voltage pulses.

12. A method of controlling the gate voltage of a power transistor in a switching mode power supply of the type including a power transistor having a current path in series with a primary winding of a transformer, comprising the steps of:

(a) generating repetitive voltage pulses having a pulse width related to operation of said power supply;

(b) applying said voltage pulses to the gate of said power transistor;

(c) detecting conduction of current through said power transistor and altering said voltage pulses in response thereto, the step of detecting the conduction of current including generating a sense voltage related to current through the power transistor, wherein said sense voltage is used in said step of generating voltage pulses;

(d) and inhibiting said step of altering in a varying amount in response to said voltage pulses, wherein said step of inhibiting includes altering said sense voltage at a leading edge of each of said voltage pulses, and wherein said altering said sense voltage includes shorting said sense voltage through a junction type field effect transistor having a voltage applied to its gate responsive to said voltage pulses.

13. A method according to claim 8 wherein said power transistor is an N-channel MOS field effect transistor.

14. A power supply circuit comprising:

(a) a transformer having a primary winding and a secondary winding;

(b) a power MOS transistor having a source-to-drain path and a gate;

(c) a source of DC voltage;

(d) a load circuit having a series inductor;

(e) at least part of said primary winding of said transformer being connected in series with said source-to-drain path of said power MOS transistor and said source of DC voltage;

(f) said secondary winding of said transformer being connected in series with said load circuit and rectifying means;

(g) a drive pulse generator circuit having an input coupled to said load circuit to detect voltage in said load circuit and having an output in the form of repetitive pulses of variable width, said output being coupled to said gate of said power MOS transistor;

(i) sensing means responsive to current in said source-to-drain path of said power transistor and having an output connected to an input of said pulse generator to control generation of said pulses, and including a control transistor having a current path shunting said input of said pulse generator to inhibit said control at the beginning of each of said repetitive pulses.

15. A device according to claim 14 wherein said power supply device is a non-regulated rectifier, said power transistor is an N-channel MOS power transistor, and said transformer is centertapped.

16. A device according to claim 14 wherein said transistor is an N-channel, MOS field-effect transistor, and said sensing means includes a resistor connected in series with a source-to-drain path of said transistor.

17. A device according to claim 14 wherein said transistor is a diffused, short-channel device having horizontal current flow from a source contact on one face of a semiconductor substrate through an N-channel and vertical current flow to a drain contact on an opposite face of the substrate.

18. A device according to claim 17 wherein the source contact of said transistor surrounds the gate, and a source region of said transistor is surrounded and enclosed by a P-type region, the source being shorted to the P-type region.

* * * * *